(12) United States Patent
Kwon et al.

(10) Patent No.: US 12,155,455 B2
(45) Date of Patent: Nov. 26, 2024

(54) BROADCAST NODE AND METHOD FOR DYNAMICALLY MANAGING RADIO RESOURCES AND HETEROGENEOUS NETWORK CONNECTIVITY IN BROADCAST NODE

(71) Applicant: ELECTRONICS AND TELECOMMUNICATIONS RESEARCH INSTITUTE, Daejeon (KR)

(72) Inventors: Sun-Hyoung Kwon, Daejeon (KR); Sung-Ik Park, Daejeon (KR); Nam-Ho Hur, Daejeon (KR); Rufino Reydel Cabrera, Donostia-SanSebastian (ES); Eneko Iradier, Donostia-SanSebastian (ES); Jon Montalban, Donostia-SanSebastian (ES); Pablo Angueira, Donostia-SanSebastian (ES)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 35 days.

(21) Appl. No.: 18/146,983

(22) Filed: Dec. 27, 2022

(65) Prior Publication Data

US 2023/0403090 A1    Dec. 14, 2023

(30) Foreign Application Priority Data

Jun. 14, 2022 (KR) .................. 10-2022-0071978

(51) Int. Cl.
*H04H 60/91* (2008.01)

(52) U.S. Cl.
CPC ..................... *H04H 60/91* (2013.01)

(58) Field of Classification Search
CPC ........ H04H 20/71; H04H 60/04; H04H 60/91; H04L 65/104; H04L 65/611; H04N 21/6112; H04N 21/6131; H04W 4/06
(Continued)

(56) References Cited

U.S. PATENT DOCUMENTS

2004/0212681 A1* 10/2004 Cho ..................... H04H 60/04
                                                                  348/192
2005/0234993 A1* 10/2005 Ordille ................... H04L 12/18
(Continued)

FOREIGN PATENT DOCUMENTS

KR    10-2021-0149287 A    12/2021

OTHER PUBLICATIONS

Jon Montalban et al., "Broadcast Core-Network: Converging Broadcasting With the Connected World," IEEE Transactions on Broadcasting, Sep. 2021, vol. 67, No. 3.

*Primary Examiner* — Tan H Trinh (57) ABSTRACT

Disclosed herein are a broadcast node and a method for dynamically managing radio resources and heterogeneous network connectivity. The broadcast node is installed for a transmitter of an intelligent broadcast/broadband network, wherein the broadcast node is configured to generate an attribute message including an associated identification parameter for connection to a broadcast core network, and initiate a series of communication protocols for connection with additional intelligent entities, and manage a service request queue, a radio resource, an interface, and one or more services.

17 Claims, 6 Drawing Sheets

(58) Field of Classification Search
USPC .................................................... 455/3.01
See application file for complete search history.

(56) References Cited

U.S. PATENT DOCUMENTS

| | | | |
|---|---|---|---|
| 2006/0128422 A1* | 6/2006 | van Rooyen | H04L 65/612 |
| | | | 455/552.1 |
| 2007/0038823 A1* | 2/2007 | Banks | H04L 67/1095 |
| | | | 711/162 |
| 2010/0095308 A1* | 4/2010 | Blue | G06F 9/546 |
| | | | 719/314 |
| 2011/0153859 A1* | 6/2011 | Lee | H04N 21/6118 |
| | | | 709/231 |
| 2011/0179176 A1* | 7/2011 | Ravichandran | H04L 9/40 |
| | | | 709/226 |
| 2016/0212626 A1* | 7/2016 | Simon | H04W 16/14 |
| 2016/0374107 A1* | 12/2016 | Das | H04L 65/611 |
| 2018/0026733 A1* | 1/2018 | Yang | H04N 21/235 |
| | | | 725/33 |
| 2021/0377318 A1 | 12/2021 | Jung | |
| 2022/0345855 A1* | 10/2022 | May | H04W 4/023 |
| 2023/0199431 A1* | 6/2023 | Gune | H04W 36/32 |
| | | | 455/456.1 |
| 2024/0073796 A1* | 2/2024 | Azizi | H04W 24/08 |

* cited by examiner

BROADCAST NODE AND METHOD FOR DYNAMICALLY MANAGING RADIO RESOURCES AND HETEROGENEOUS NETWORK CONNECTIVITY IN BROADCAST NODE

CROSS REFERENCE TO RELATED APPLICATION

This application claims the benefit of Korean Patent Application No. 10-2022-0071978, filed Jun. 14, 2022, which is hereby incorporated by reference in its entirety into this application.

BACKGROUND OF THE INVENTION

1. Technical Field

The following embodiments relate generally to wireless communication, and more particularly to technology for broadcasting networks in heterogeneous environments.

2. Description of the Related Art

Modern wireless communication has evolved from an Internet Protocol (IP)-centered aspect. Next-Generation Network (NGN) architecture may be divided into an Access Network (AN) and a Core Network (CN).

The access network collects bidirectional end-user traffic and connects the collected traffic from all end-users to the core network. The core network is an intelligent entity, and configures a transfer system composed of networks, system equipment, and infrastructure for connecting service providers to the access network.

In mobile network industries, the importance of the core network is more and more emphasized. The core network is a disruptive concept of terrestrial television infrastructure, but a Third Generation Partnership Project (3GPP) ecosystem originally uses architecture having a core network and an access network.

The flexibility, scalability, accessibility, security, modularity, and others of the core network have been upgraded every decade. For example, 3GPP Release-15 proposed Service-Based Architecture (SBA) driven by new technology such as virtualization, cloud-native architectures, containerization, micro-services orientation, and automation.

Recent 3GPP Release-16 has proposed upgrade including the support of large-scale cellular IoT (5G_CIoT), the support of Access Traffic Steering, Switch and Splitting (ATSSS), the availability of Network Automation (eNA), and the enhancement of Ultra-Reliable Low Latency Communications (5G_URLLC). This proposal includes an enhanced version of enTV, which provides terrestrial TV broadcasting in a wider range through more efficient distribution using High Power High Tower (HPHT) broadcasting facilities.

With the trend of 5G, 6G networks are planned to support much more terminal devices. 6G networks are mainly connected based on usage cases or subscriber communication requirements. Consequently, a predicted throughput peak load is increased, and a latency requirement becomes more complicated. A 6G core network architecture needs to be rapidly scaled up or scaled down (latency: 10 to 100 μs) while minimizing overhead consumption of resources.

Globally, mobile networks have acceleratively evolved, and make the way for heterogeneous scenarios in which all other networks may coexist under the 5G Core (5GC).

On the other hand, a point-to-multipoint connection may provide assistance to some services such as Internet-of-Things (IoT) for vehicles or isolated regions. Nevertheless, a cellular ecosystem could not acquire a broadcasting scheme that is as efficient as traditional one-to-many networks. Digital Terrestrial Television (DTT) may be an essential player in heterogeneous IP-centered markets which are capable of solving verticals through a possessed core network architecture or subsequent integration in 5GC.

The ATSC 3.0 (S43 ATSC 3.0) Core Network group conducts research into the concept of a core network, and applies the concept of the core network to ATSC 3.0 digital terrestrial broadcasting. That is, specific usage cases and commercial advantages of broadcast core network technology are included. In Europe, Digital Video Broadcasting (DVB) aims at IP integration with DVB Native IP (DVB-NIP) specifications. DVB-NIP refers to an intersection between a linear broadcasting television and Internet media streaming. An IP-based linear television service provides a possibility to be delivered not only to an Internet connection device over the Internet based on existing standards (e.g., DVB-S2X, DVB-I, DVB-HB, DVB-mABR, DVB-DASH, etc.) but also to a broadcasting device through IP.

However, in a radio access field, unless an existing transmission facility forms a pair with an intelligent transmitter node, an entity as a broadcast core network is not applied. When the existing transmission facility is maintained in a current form, it is meaningless to include a Broadcast core Network (BCN) in broadcasting architecture. For this reason, it is important to manage DTT transmission towers' own resources and upgrade the current transmitter facility including a software-based intelligent node capable of interfacing with other entities so as to provide a flexible and scalable system.

SUMMARY OF THE INVENTION

An embodiment is intended to provide flexibility so that a Digital Terrestrial Television (DTT) transmission tower's own resources may be managed, new protocols with the entities of additional heterogeneous networks may be provided, and interfacing with the entities may be performed.

In accordance with an aspect to accomplish the above object, there is provided a broadcast node installed for a transmitter of an intelligent broadcasting network, wherein the broadcast node is configured to generate an attribute message including an associated identification parameter for connection to a broadcast core network, and initiate a series of communication protocols for connection with additional intelligent entities, and manage a service request queue, a radio resource, an interface, and one or more services.

The series of communication protocols may include a protocol corresponding to a standard for managing a broadcast transmission layer, and protocols associated with data sources from one or more heterogeneous data networks.

The broadcast node includes a broadcast node management unit configured to adjust two or more functions and control interfaces with one or more different data sources and entities, a micro-gateway configured to generate a data flow communicating with an exciter of a digital terrestrial television transmitter from pieces of data input from the one or more different data sources, and an interfacing block configured to access and decode pieces of data from the one or more different data sources, entities, and services.

The broadcast node management unit may further perform a function corresponding to at least one of local radio resource management for maximizing use of a spectrum by monitoring the use of the spectrum, media processing and service quality measurement for analyzing media information data, network monitoring, management of interworking with one or more heterogeneous data networks, or generation of control plane information required for new usage cases, or a combination thereof.

The micro-gateway may further perform a function corresponding to at least one of a function of analyzing, multiplexing, and encoding/decoding different link layer protocols, a function of generating a preamble stream, a function of managing and generating synchronization with an additional network node, a function of generating a baseband packet delivered to an exciter, or a combination thereof.

The interfacing block may include at least one of a legacy digital terrestrial television receiver, a Studio to Transmitter Link (STL) receiver, an Inter-Tower Communication Network (ITCN), and In-Band Distribution Link (IDL), an IP video receiver, an Inter-Working function (IWF), a broadcast core network input/output function, or a combination thereof.

The broadcast node may include an interface A that is an input point for different input data types.

The broadcast node may further include at least one of an interface B configured to interwork with heterogeneous radio access networks, an interface C connected to a broadcast core network, or a combination thereof.

The interface A may include at least one of a data source interface, an interface for a studio link of a digital terrestrial television system, or a new data delivery interface based on an ITCN and the IDL or a combination thereof.

The interface B may include at least one of a Third Generation Partnership Project (3GPP) interface, an interworking interface for heterogeneous RANs and entities, a Internet-of-Things (IoT) interface, or a satellite communication interface, or a combination thereof.

The broadcast node may include memory configured to store at least one program, and a processor configured to execute the program, wherein the program is configured to perform configuring an interface with additional entities, in response to a service request depending on a priority queue, managing an input data source, interfaces, and radio resources corresponding to the service request, and processing data corresponding to the service request by configuring an exciter interface.

The program may be configured to perform before configuring the interface with the additional entities, configuring an interface with a broadcast core network, and adjusting a frequency and a time to correspond to the broadcast core network.

The program may be configured to repeatedly perform the configuring, the managing, and the processing when a new interface or an upgrade of or software is requested.

The program may be configured to repeatedly perform the managing when a new service is requested and a resource is available.

In accordance with another aspect to accomplish the above object, there is provided a method for dynamically managing radio resources and heterogeneous network connectivity in a broadcast node, the method including configuring an interface with additional entities, in response to a service request depending on a priority queue, managing an input data source, interfaces, and radio resources corresponding to the service request, and processing data corresponding to the service request by configuring an exciter interface.

The method may further include, before configuring the interface with the additional entities, configuring an interface with a broadcast core network, and synchronizing a frequency and a time to correspond to the broadcast core network.

The method may further include, whenever a new interface or upgrade of software is requested, repeatedly performing the configuring, the managing, and the processing.

The method may further include when a new service is requested and a resource is available, repeatedly performing the managing.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Hereinafter, an apparatus and a method according to embodiments will be described in detail with reference to FIGS. 1 to 8.

Figure 1:
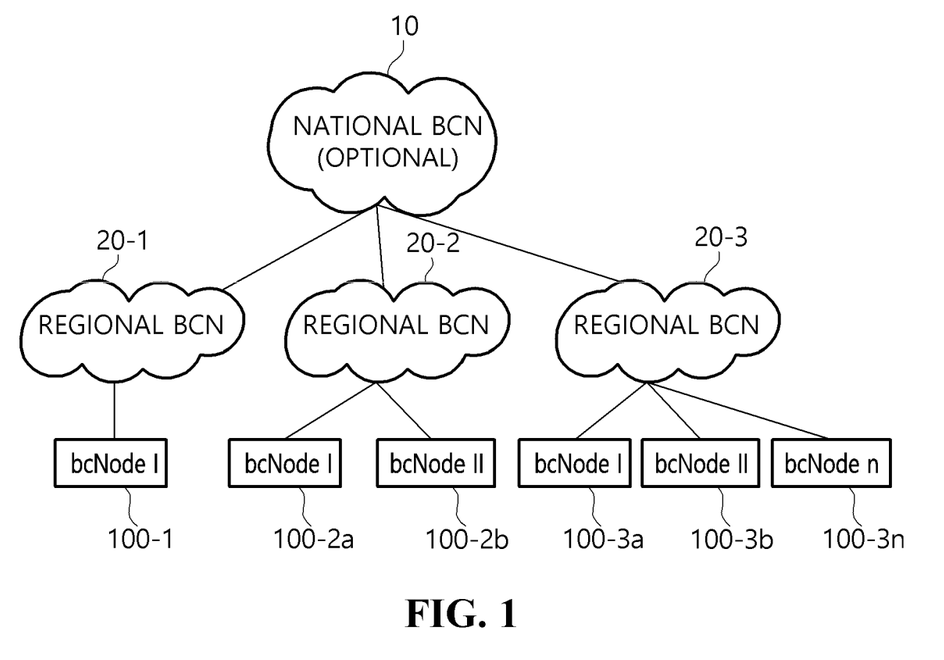
FIG. 1 is a diagram illustrating an example in which a broadcast core network manages different broadcast nodes using hierarchical architecture.

FIG. 1 is a diagram illustrating an example in which a broadcast core network manages different broadcast nodes using hierarchical architecture.

Referring to FIG. 1, Broadcast Core Networks (BCN) 10, 20-1, 20-2, and 20-3 may be hierarchically configured. That is, the example may have a configuration in which the multiple lower regional BCNs 20-1, 20-2, and 20-3 are connected to the upper national BCN 10.

Multiple Broadcast Nodes (bcNode) 100-1, 100-2a, 100-2b, 100-3a, 100-3b, . . . , 100-3n may be connected to the regional BCNs 20-1, 20-2, and 20-3 in regions in which the broadcast nodes are located, thus communicating with other broadcast nodes.

Here, each of the broadcast nodes 100-1, 100-2a, 100-2b, 100-3a, 100-3b, . . . , 100-3n may be installed in a Digital Terrestrial Television (DTT) broadcast transmitter.

Each of the broadcast nodes 100-1, 100-2a, 100-2b, 100-3a, 100-3b, . . . , 100-3n may generate an attribute message including an associated identification parameter for connection to the corresponding broadcast core network, initiate a series of communication protocols for connection to other intelligent entities, and manage a service request queue, radio resources, an interface, and at least one service.

Here, the series of communication protocols may include a protocol corresponding to a standard for managing a broadcast transmission layer, and protocols associated with data sources from one or more heterogeneous data networks.

Therefore, a broadcast transmitter (BTX) may evolve into an enhanced broadcast transmitter (eBTX) capable of interfacing with another broadband data network while maintaining a function of a legacy station as a broadcast transmitter (BTX) for existing traditional digital terrestrial television.

Figure 2:
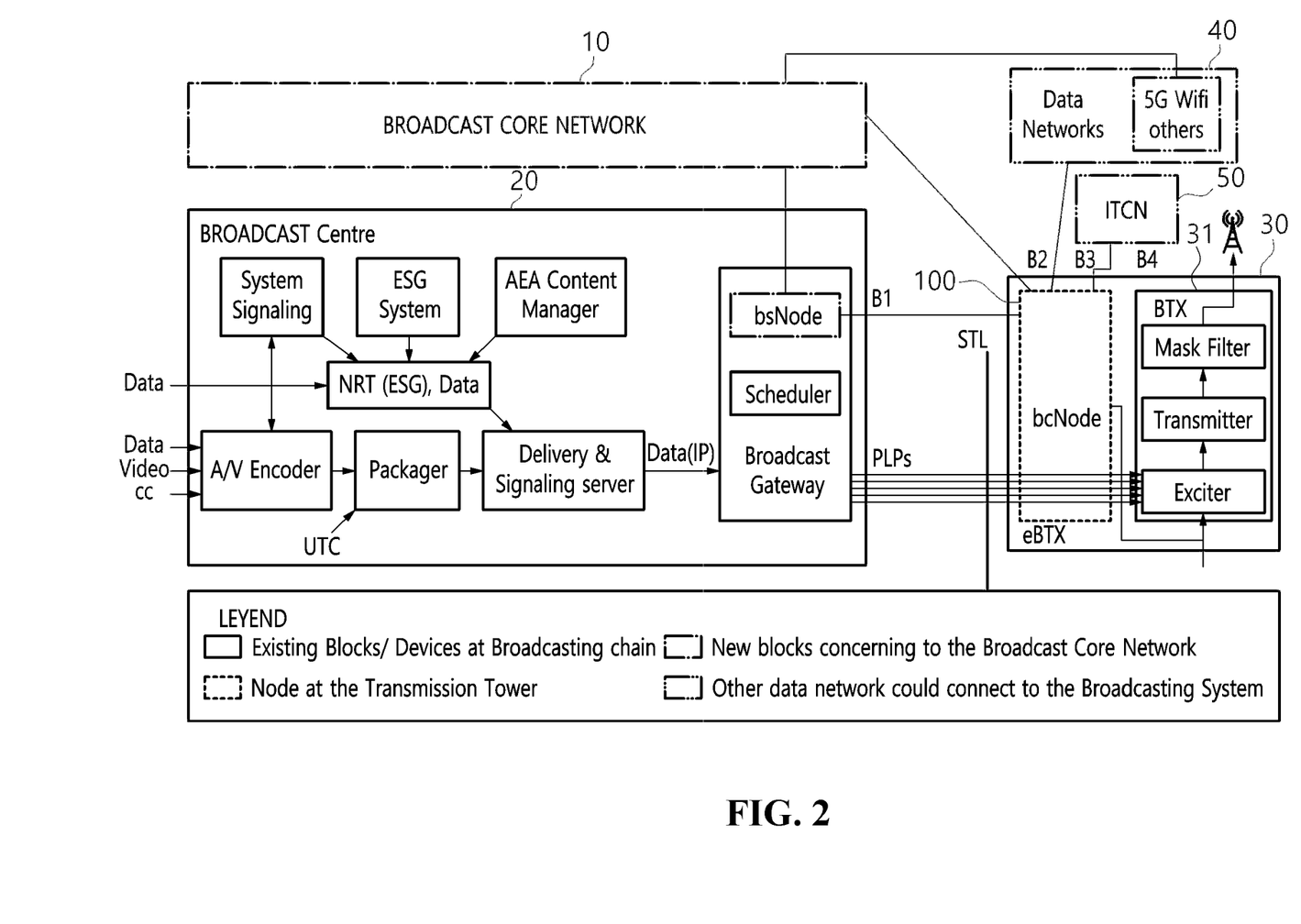
FIG. 2 is a diagram illustrating an example of interfacing with multiple entities of a broadcast node and a data network in a broadcast core network service-based architecture.

FIG. 2 is a diagram illustrating an example of interfacing with multiple entities of a broadcast node and a data network in a broadcast core network service-based architecture.

Referring to FIG. 2, a broadcast core network service-based architecture may include five planes, such as a Broadcast Core Network (BCN) 10, a broadcast centre 20, an Enhanced Broadcast Transmitter (eBTX) 30, data networks 40, and an Integrated Tower Communication Network (ITCN) 50.

The BCN 10 may be a control plane including different network functions (NF).

The broadcast centre 20 may perform a broadcasting IP-based studio function for delivering linear audio/video (A/V), and may include multimedia encoding infrastructure, signal and electronic service guide (ESG) generation, a content manager, and a packaging protocol.

The Enhanced Broadcast Transmitter (eBTX) 30 may include a function module 31 configuring an existing broadcast transmitter (BTX) in a standalone mode in which linear television signals are delivered.

Further, in an embodiment, the eBTX 30 may evolve by including a broadcast node (bcNode) 100 functioning as an interface gateway with other broadband data networks. That is, the broadcast node (bcNode) 100 interacts with a broadcast system transmission function only in an enhanced mode, and is not operated in the standalone mode.

The broadcast node (bcNode) 100 may interface and operate with all of five planes, that is, the broadcast centre, the broadcast transmitter, the data network, the ITCN, and the BCN. For example, the broadcast node (bcNode) 100 may route the data network 40 and the BCN 10, may support a Radio Resource Management (RRM) function, and may ultimately process the connection of user equipment (UE) to the BCN 10.

Figure 3:
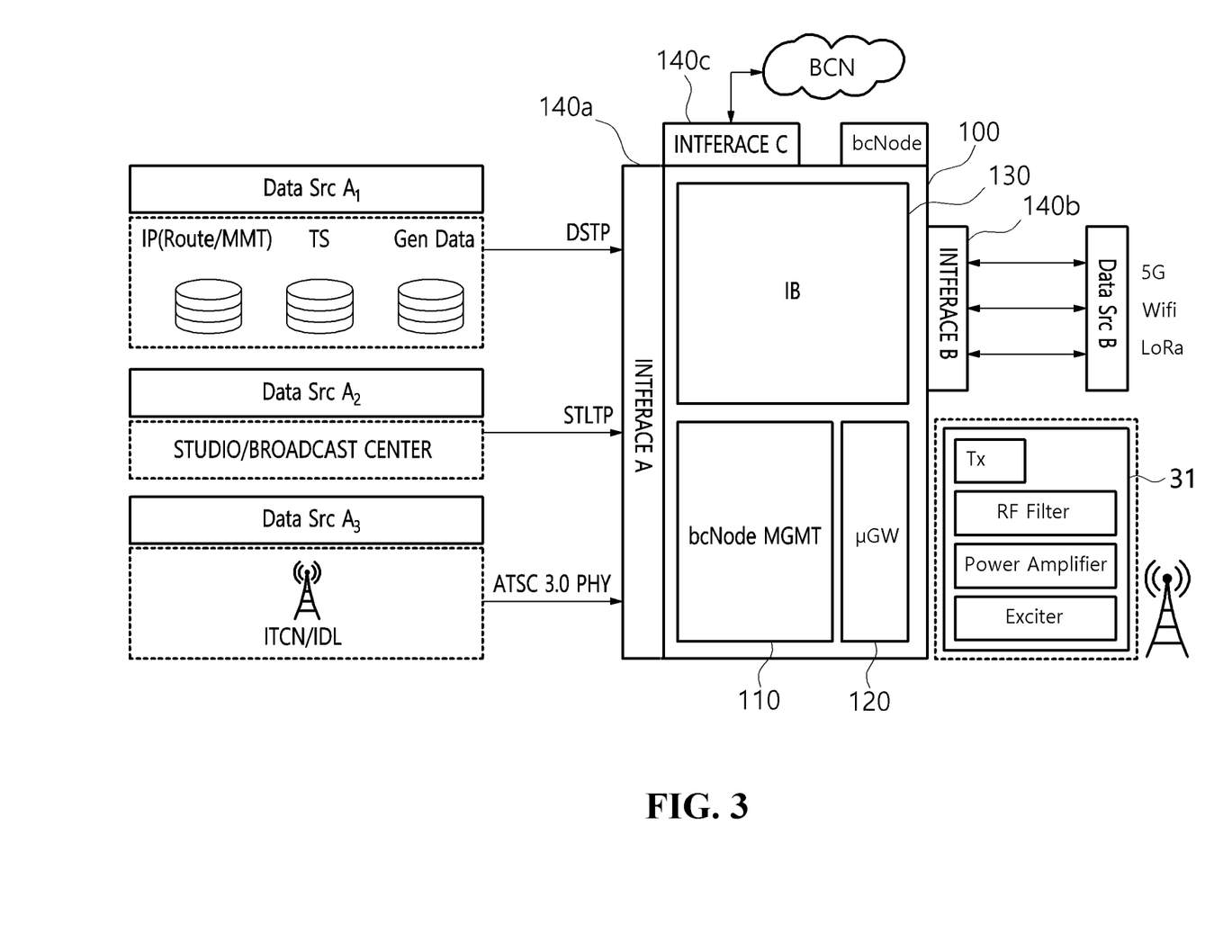
FIG. 3 is a schematic block diagram of a broadcast node according to an embodiment.
Figure 4:
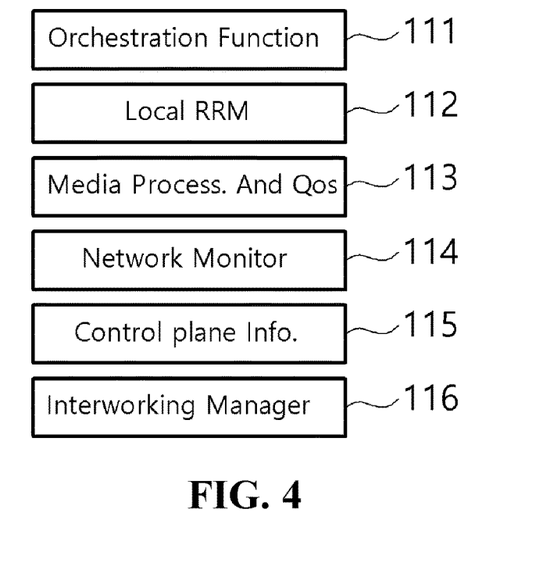
FIG. 4 is a schematic functional block diagram of a broadcast node management unit according to an embodiment.
Figure 5:
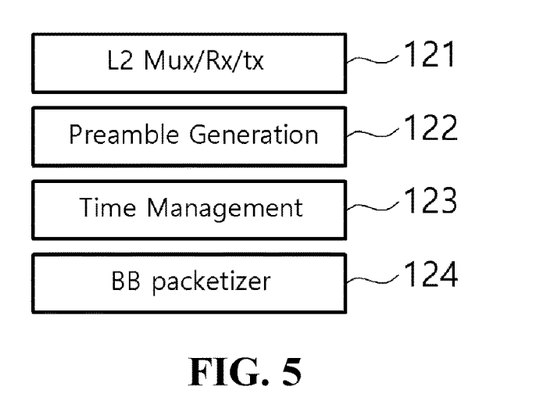
FIG. 5 is a schematic functional block diagram of a micro-gateway according to an embodiment.
Figure 6:
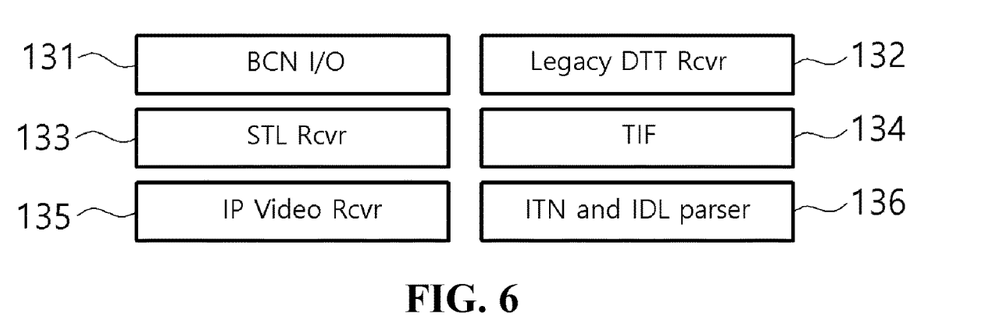
FIG. 6 is a schematic functional block diagram of an interfacing block according to an embodiment.

FIG. 3 is a schematic block diagram of a broadcast node according to an embodiment, FIG. 4 is a schematic functional block diagram of a broadcast node management unit according to an embodiment, FIG. 5 is a schematic functional block diagram of a micro-gateway according to an embodiment, and FIG. 6 is a schematic functional block diagram of an interfacing block according to an embodiment.

Referring to FIG. 3, a broadcast node (bcNode) 100 according to an embodiment may include, as internal blocks, a broadcast node management unit (BcNode MGMT) 110, a micro-gateway (GW) 120, and an interfacing block (IB) 130.

The broadcast node management unit (bcNode MGMT) 110 may be the core and head of the broadcast node (bcNode) 100.

Referring to FIG. 4, the broadcast node management unit (bcNode MGMT) 110 has an orchestration function 111 of orchestrating all functions of the broadcast node (bcNode) 100 and controlling interfaces with other data sources and entities. That is, the broadcast node management unit (bcNode MGMT) 110 may control information exchange with the broadcast core network 10, communication between the nodes of the broadcast centre 20, and the exchange of control data therebetween.

Also, the broadcast node management unit (bcNode MGMT) 110 may include a local intelligent radio resource management module (local RRM) 112 for monitoring the use of a spectrum and maximizing the utilization of resources.

Further, the broadcast node management unit (bcNode MGMT) 110 may include, as one of principal applications, all types of multimedia transmission modules 113. Therefore, media processing such as the analysis of media information data construction and a service quality evaluation function (Quality of Service: QoS) such as throughput, jitter, and delay, may be integrated into the modules 113.

Based on these solutions, broadcasting infrastructure may be treated as another IP-based network, and thus the broadcast node management unit (bcNode MGMT) 110 may include a network monitoring sub-module 114.

Connections to other Radio Access Networks (RAN) are also important. Therefore, the broadcast node management unit (bcNode MGMT) 110 may include an interworking sub-module (interworking manager) 116 which takes charge of access to equipment connected through a non-broadcasting network.

Furthermore, the broadcast node management unit (bcNode MGMT) 110 may include a function 115 of generating control plane information required for activated new usage cases (e.g., In-Band Distribution Link (IDL), Inter-Tower Communication Network (ITCN), or the like).

Referring to FIG. 3, the micro-gateway (μGW) 120 allows an exciter included in a Digital Terrestrial Television (DTT) transmitter 31 to communicate with the broadcast node (bcNode) 100. Here, the exciter and the broadcast node (bcNode) 100 may be connected to each other in a point-to-point connection.

Furthermore, the micro-gateway (μGW) 120 must be able to directly collect data from different data sources and modify/update/signal the collected data in a seamless data flow. That is, the micro-gateway (μGW) 120 may prepare a data stream for generating a DTT physical layer, which may belong to some of functions from the traditional concept of the gateway.

For this operation, referring to FIG. 5, the micro-gateway (μGW) 120 may include a function 121 of parsing, multiplexing, and encoding/decoding ALP/GSE/MPEG-TS, which are protocols of various link layers L2.

Furthermore, the micro-gateway (μGW) 120 may include a signaling generation block 122 including a preamble stream and a management generation (time management) block 123 for synchronization with other network nodes.

In addition, the micro-gateway (μGW) 120 may also include a baseband packetizer 124 for directly supplying packets to the exciter.

Meanwhile, referring to FIG. 3, the interfacing block 130 aims at connecting other data sources, entities, and services to the broadcast node (bcNode) 100. That is, the broadcast node 100 may access an existing data source (e.g., a content delivery network (CDN), a server or the like), but may access and decode distribution data activated in a DTT physical (PHY) waveform delivered from other stations.

Therefore, referring to FIG. 6, the interfacing block 130 may integrate a legacy DTT receiver 132, a STL receiver 133, and an IP video receiver 135 with each other. Further, the interfacing block 130 may provide an ITCN and IDL signal context parser 136.

The interfacing block 130 may include tunneling interworking functions (TIF) 134 associated with the interworking module of the broadcast management unit (BcNode MGMT) 110, which permits mutual connection with other service entities.

Further, the interfacing block 130 sets a packet tunneled with another radio access network (RAN) concerned with RF resource allocation. Therefore, the interfacing block 130 may include a Broadcast Core Network (BCN) I/O 131, which is a RESTful-based Application Programming Interface (API) for exchanging control information generated by the broadcast management unit (BcNode MGMT) 110 with the broadcast core network (BCN) 30.

Meanwhile, referring to FIG. 3, the broadcast node (bcNode) 100 according to an embodiment may include one or more interfaces 140a, 140b, and 140c, as external blocks.

The interface A 140a may be a point of entry into various data types that can be collected by the broadcast node (bcNode) 100.

Also, according to an embodiment, the interface A 140a may include a data source (IP video, MPEG-TS, MMT/ROUTE, DASH, STLTP, and others) interface A.1, an interface A.2 for a studio classic contribution link of a DTT system, and new data delivery interface A.3 based on ITCN and IDL.

Further, the interface B 140b may be an interface interworking with heterogeneous radio access networks.

Also, according to an embodiment, the interface B 140b may include a 3GPP (6G, 5G, 4G, etc.) interface B.1, an interface B.2 enabling interworking with other RANs and entities such as Wi-Fi (802.11a/b/g/ac/), an IoT (LoRa, NB-IoT, etc.) interface B.3, and a satellite communication interface B.4.

Figure 7:
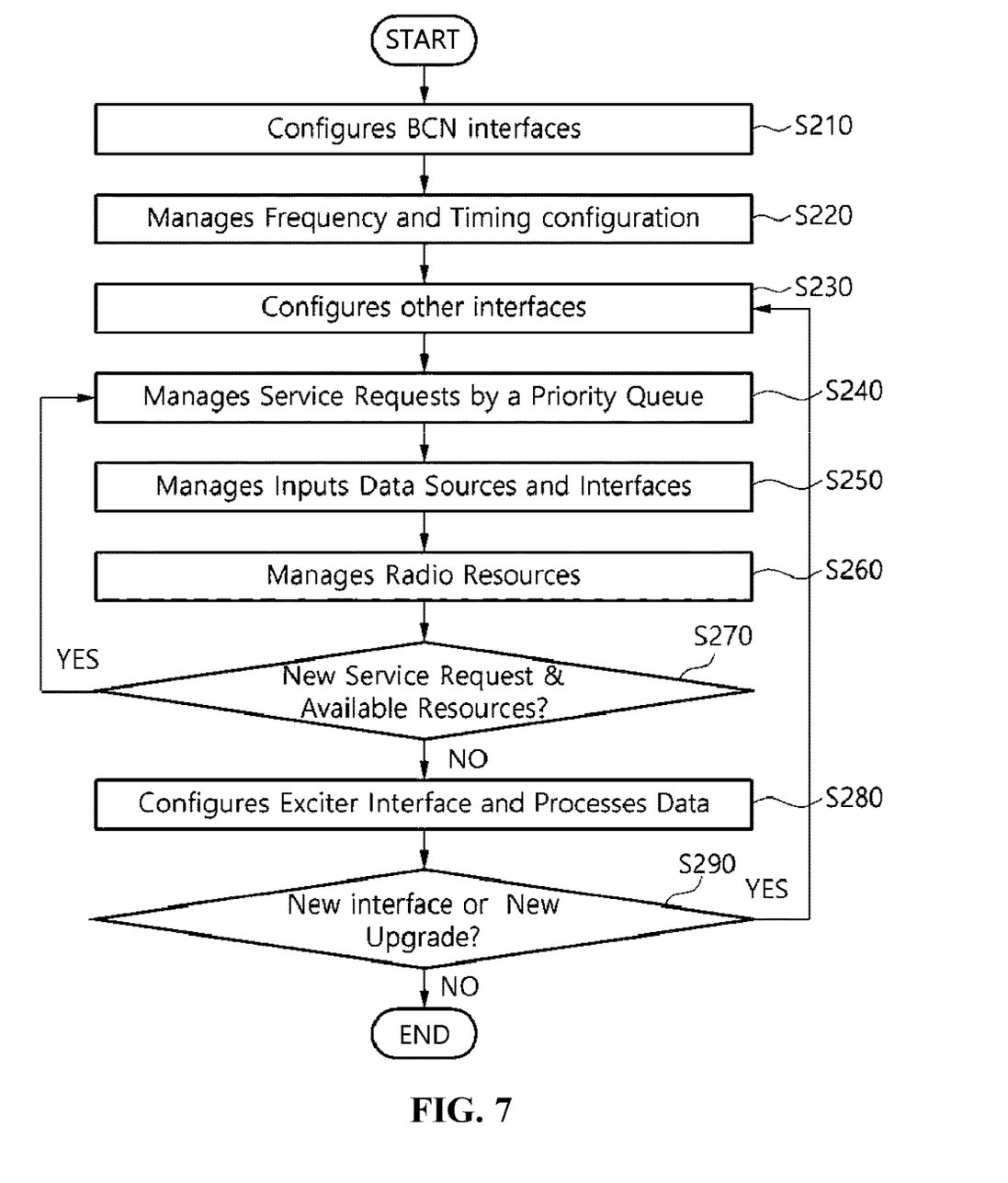
FIG. 7 is a flowchart for explaining a method for dynamically managing radio resources and heterogeneous network connectivity according to an embodiment.

FIG. 7 is a flowchart for explaining a method for dynamically managing radio resources and heterogeneous network connectivity according to an embodiment.

Referring to FIG. 7, the method for dynamically managing radio resources and heterogeneous network connectivity in a broadcast node according to the embodiment may include step S230 of configuring an interface with other entities, steps S240 to S260 of, in response to a service request depending on a priority queue, managing an input data source, interfaces, and radio resources corresponding to the service request, and step S280 of configuring an exciter interface and processing data corresponding to the service request.

Here, the method for dynamically managing radio resources and heterogeneous network connectivity in a broadcast node according to the embodiment may further include, before step S230 of configuring the interface with other entities, step S210 of configuring interfaces (BCN interfaces) with broadcast core networks (BCNs), and step S220 of adjusting a frequency and a time to correspond to the broadcast core network.

Here, whenever a new interface or the upgrade of software is requested at step S290, steps S230 to S280 may be repeatedly performed.

Here, when a new service is requested, and resources are available at step S270, steps S240 to S260 may be repeatedly performed.

Figure 8:
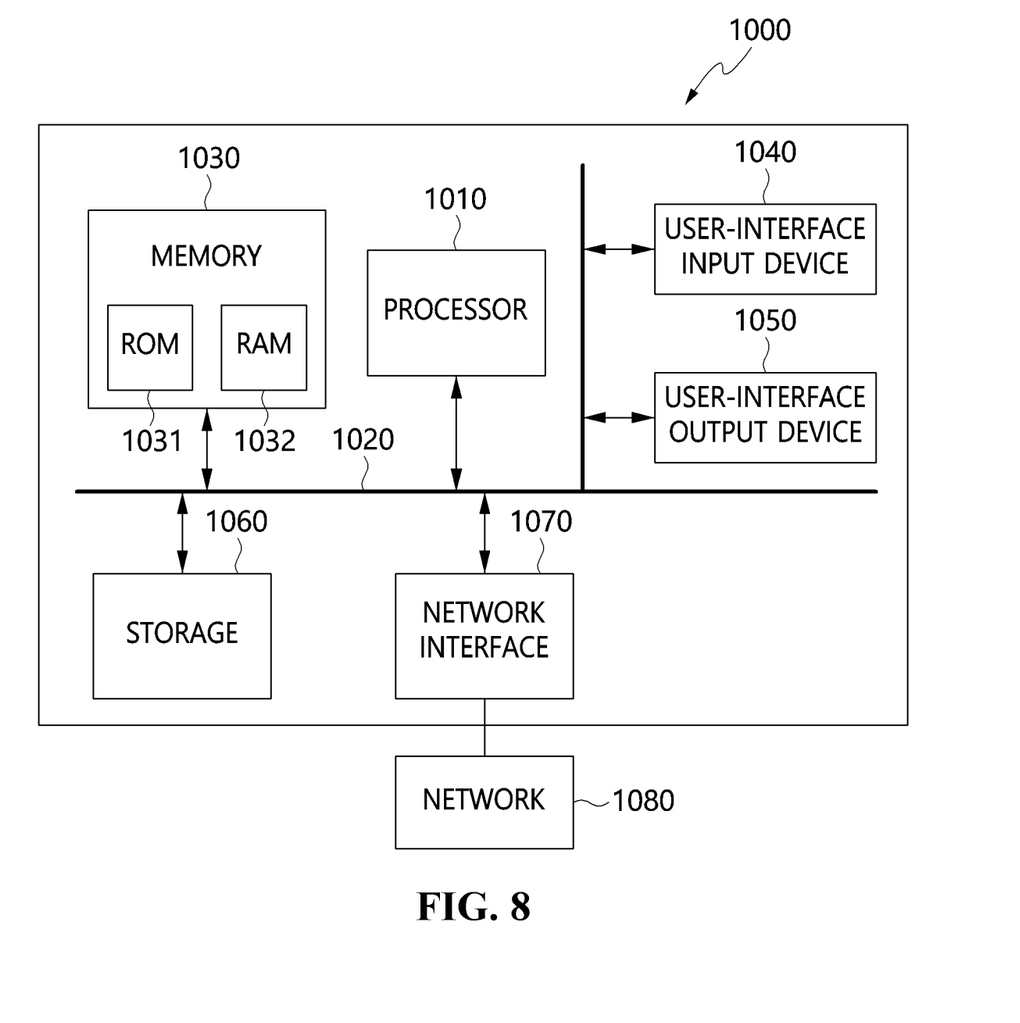
FIG. 8 is a diagram illustrating the configuration of a computer system according to an embodiment.

FIG. 8 is a diagram illustrating the configuration of a computer system according to an embodiment.

A broadcast node according to an embodiment may be implemented in a computer system 1000, such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, and an information delivery medium. For example, the memory 1030 may include Read-Only Memory (ROM) 1031 or Random Access Memory (RAM) 1032.

In accordance with the embodiments, a node has flexibility that enables the node to include new protocols and interfaces with other networks.

In accordance with the embodiments, a node may control the configuration of a DTT exciter so that a previously defined criterion may be maximized and the node may evolve into a more efficient and secure architecture in the future.

Although the embodiments of the present disclosure have been disclosed with reference to the attached drawing, those skilled in the art will appreciate that the present disclosure can be implemented in other concrete forms, without changing the technical spirit or essential features of the disclosure. Therefore, it should be understood that the foregoing embodiments are merely exemplary, rather than restrictive, in all aspects.

What is claimed is:

1. A broadcast node installed for a transmitter of an intelligent broadcasting network, wherein:
the broadcast node is configured to:
generate an attribute message including an associated identification parameter for connection to a broadcast core network, and initiate a series of communication protocols for connection with additional intelligent entities, and
manage a service request queue, a radio resource, an interface, and one or more services; and
wherein the broadcast node comprises:
a broadcast node management unit configured to adjust two or more functions and control an interface with one or more different data sources and entities;
a micro-gateway configured to generate a data flow communicating with an exciter of a digital terrestrial television transmitter from pieces of data input from the one or more different data sources; and
an interfacing block configured to access and decode pieces of data from the one or more different data sources, entities, and services.

2. The broadcast node of claim 1, wherein the series of communication protocols comprise:
a protocol corresponding to a standard for managing a broadcast transmission layer; and
protocols associated with data sources from one or more heterogeneous data networks.

3. The broadcast node of claim 1, wherein the broadcast node management unit further performs a function corresponding to at least one of local radio resource management for maximizing use of a spectrum by monitoring the use of the spectrum, media processing and service quality measurement for analyzing media information data, network monitoring, management of interworking with one or more heterogeneous data networks, or generation of control plane information required for new usage cases, or a combination thereof.

4. The broadcast node of claim 1, wherein the micro-gateway further performs functions or set of functions corresponding to at least one of a function of analyzing, multiplexing, and encoding/decoding different link layer protocols, a function of generating a preamble stream, a function of managing and generating synchronization with an additional network node, a function of generating a baseband packet delivered to an exciter, or a combination thereof.

5. The broadcast node of claim 1, wherein the interfacing block includes at least one of a legacy digital terrestrial television receiver, a Studio to Transmitter Link (STL) receiver, an Inter-Tower Communication Network (ITCN) and In-Band Distribution Link (IDL) signaling analyzer, an IP video receiver, an Inter-Working function (WIF), a broadcast core network input/output function, or a combination thereof.

6. The broadcast node of claim 1, further comprising:
an interface A that is an input point for different input data types.

7. The broadcast node of claim 6, further comprising at least one of:
an interface B configured to interwork with heterogeneous radio access networks,
an interface C connected to the broadcast core network, or a combination thereof.

8. The broadcast node of claim 7, wherein the interface B includes at least one of a Third Generation Partnership Project (3GPP) interface, a Wi-Fi interface, an Internet-of-Things (IoT) interface, or a satellite communication interface, or a combination thereof.

9. The broadcast node of claim 6, wherein the interface A comprises at least one of:
a data source interface,
an interface for a studio link of a digital terrestrial television system,
a new data delivery interface based on an Inter-Tower Communication Network (ITCN) and the IDL, or
a combination thereof.

10. The broadcast node of claim 1, comprising:
a memory configured to store at least one program; and
a processor configured to execute the program,
wherein the program is configured to perform:
configuring an interface with additional entities;
in response to a service request depending on a priority queue, managing an input data source, interfaces, and radio resources corresponding to the service request; and
processing data corresponding to the service request by configuring an exciter interface.

11. The broadcast node of claim 10, wherein the program is configured to further perform;
before configuring the interface with the additional entities,
configuring an interface with the broadcast core network; and
adjusting a frequency and a time to correspond to the broadcast core network.

12. The broadcast node of claim 10, wherein the program is configured to repeatedly perform the configuring, the managing, and the processing when a new interface or an upgrade of or software is requested.

13. The broadcast node of claim 10, wherein the program is configured to repeatedly perform the managing when a new service is requested and a resource is available.

14. A method for dynamically managing radio resources and heterogeneous network connectivity, the method comprising:
configuring an interface with additional entities;
in response to a service request depending on a priority queue, managing an input data source, interfaces, and radio resources corresponding to the service request; and
processing data corresponding to the service request by configuring an exciter interface,
wherein the method further comprises:
adjusting two or more functions and controlling an interface with one or more different data sources and entities;
generating a data flow communicating with an exciter of a digital terrestrial television transmitter from pieces of data input from the one or more different data sources; and
accessing and decoding pieces of data from the one or more different data sources, entities, and services.

15. The method of claim 14, further comprising,
before configuring the interface with the additional entities,
configuring an interface with a broadcast core network; and
adjusting a frequency and a time to correspond to the broadcast core network.

16. The method of claim 15, further comprising,
when a new service is requested and a resource is available, repeatedly performing the managing.

17. The method of claim 14, further comprising:
when a new interface or upgrade of software is requested, repeatedly performing the configuring, the managing, and the processing.

* * * * *